Figure 1:
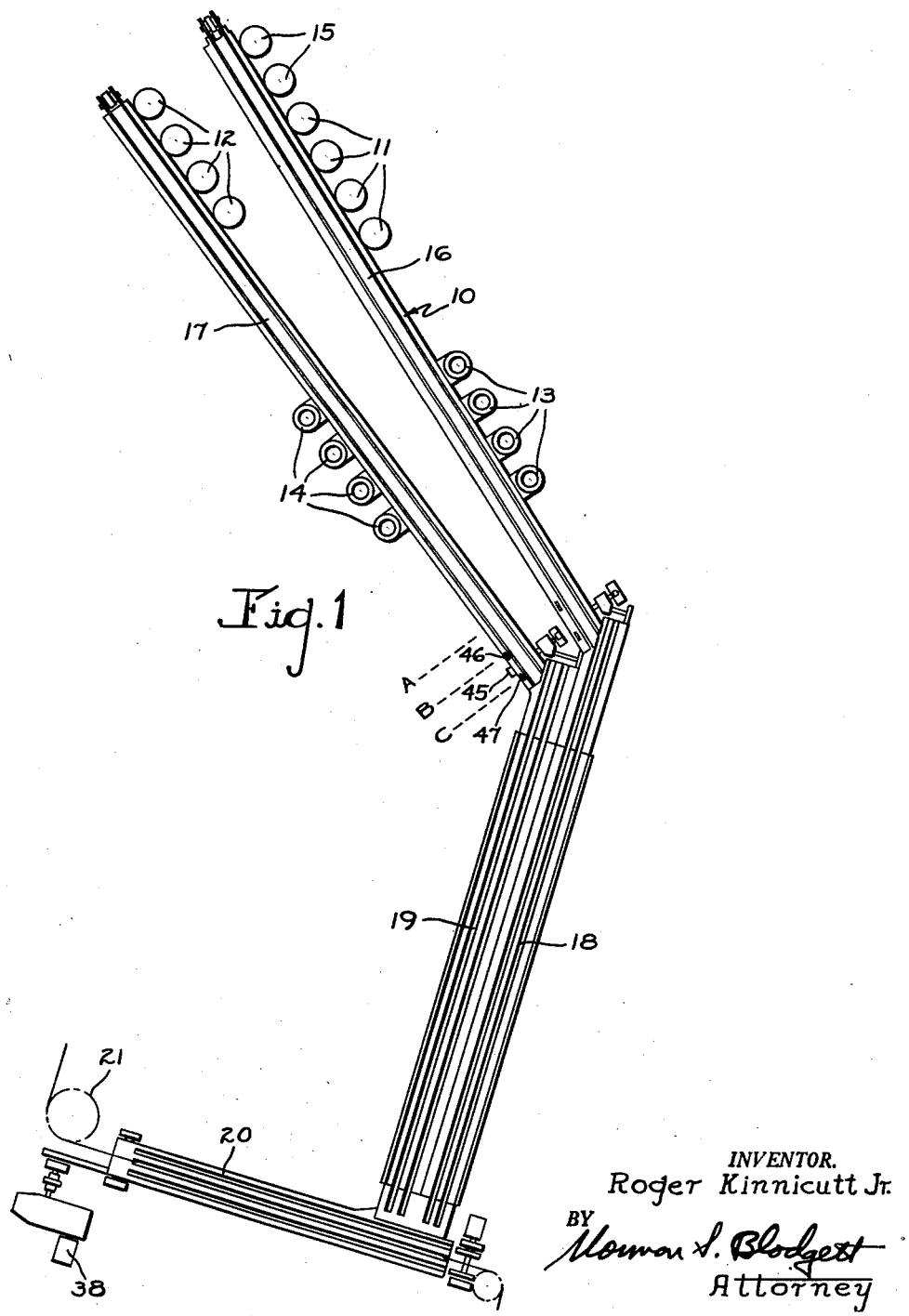

Dec. 10, 1957     R. KINNICUTT, JR     2,815,847

CONVEYING APPARATUS

Filed July 15, 1955     5 Sheets—Sheet 1

INVENTOR.
Roger Kinnicutt Jr.
BY Norman S. Blodgett
Attorney

Dec. 10, 1957  R. KINNICUTT, JR  2,815,847
CONVEYING APPARATUS
Filed July 15, 1955  5 Sheets-Sheet 2

INVENTOR.
Roger Kinnicutt Jr.
BY
Norman S. Blodgett
Attorney

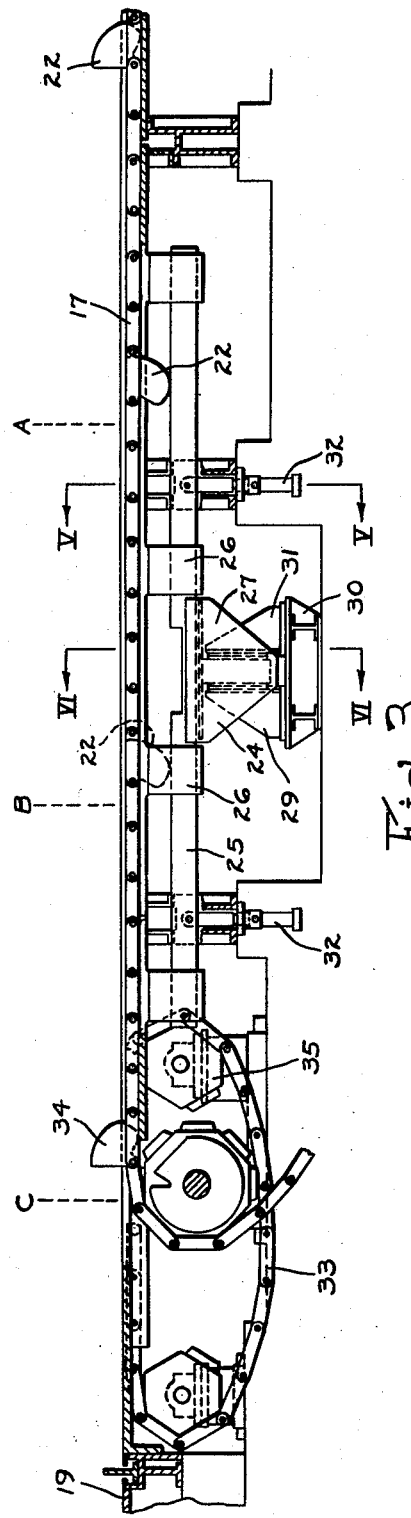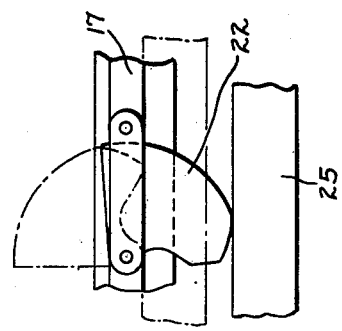

INVENTOR.
Roger Kinnicutt Jr.

Dec. 10, 1957   R. KINNICUTT, JR   2,815,847
CONVEYING APPARATUS

Filed July 15, 1955   5 Sheets-Sheet 5

INVENTOR.
Roger Kinnicutt Jr.
BY *Norman S. Blodgett*
Attorney

United States Patent Office 2,815,847
Patented Dec. 10, 1957

2,815,847

CONVEYING APPARATUS

Roger Kinnicutt, Jr., Worcester, Mass., assignor to Morgan Construction Company, Worcester, Mass., a corporation of Massachusetts Application July 15, 1955, Serial No. 522,245

8 Claims. (Cl. 198—34)

This invention relates to conveying apparatus and more, particularly, to apparatus associated with the intersection of two conveyors.

In the handling of articles and particularly in the conveying of coiled rod in the steel industry, there are many instances when the articles being conveyed must be transferred from one straight conveyor to another straight conveyor wherein the two conveyors intersect at a substantial angle. It is also necessary on occasion to introduce the articles from one conveyor to another in a well-regulated manner. This problem exists, for instance, in the case where coils of rod are being introduced to a first conveyor in a steel mill at irregular intervals. Various apparatus has been evolved in the past for performing these functions, but none has proved to be entirely satisfactory. For the most part, they have been extremely complicated, have been subject to breakdown, and have required a considerable amount of maintenance. These and other difficulties experienced with the prior art have been obviated by the present invention in a novel manner.

It is, therefore, an outstanding object of the present invention to provide for the transfer of articles from one conveyor to another when the line of action of the two conveyors are at a substantial angle.

A further object of the invention is the provision of apparatus associated with intersecting conveyors and providing a delay station there-between.

It is a still further object of this invention to provide means for introducing articles from one conveyor to another in a continuous, regulated manner when the articles are received by the first conveyor in an irregular manner.

Another object of the instant invention is the provision of a "Y" transfer mechanism for coils, which mechanism includes a delay station.

A further object of the invention is the provision of conveying apparatus including a first conveyor receiving coils of rolled material in irregular sequence from reels and transferring it to a second conveyor in a regular, continuous manner.

Another object of the invention is the provision of conveying apparatus for a rolling mill that will allow the maximum cooling time for a given space situation between coil reels and a hook carrier.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
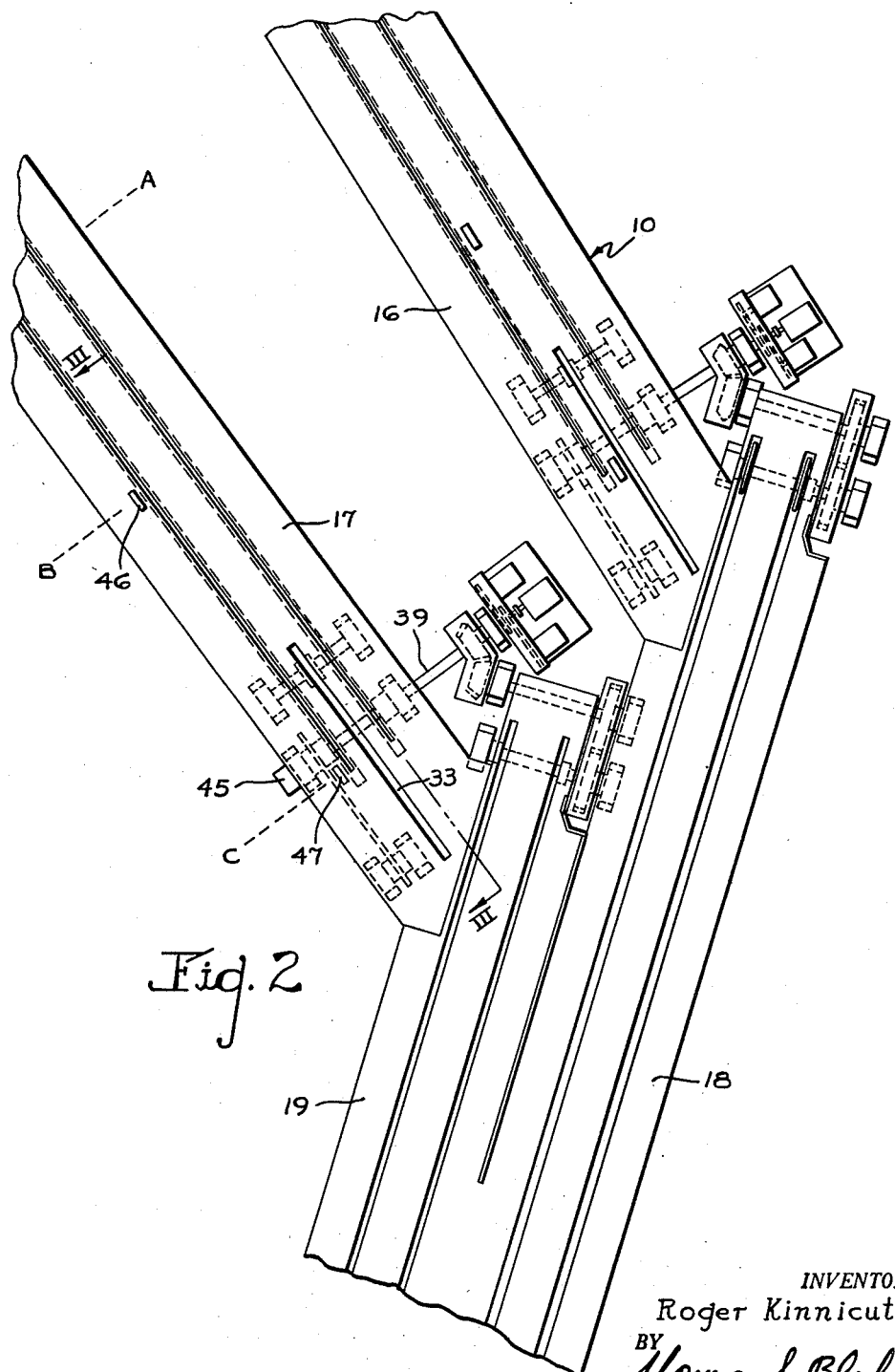
Figure 5:
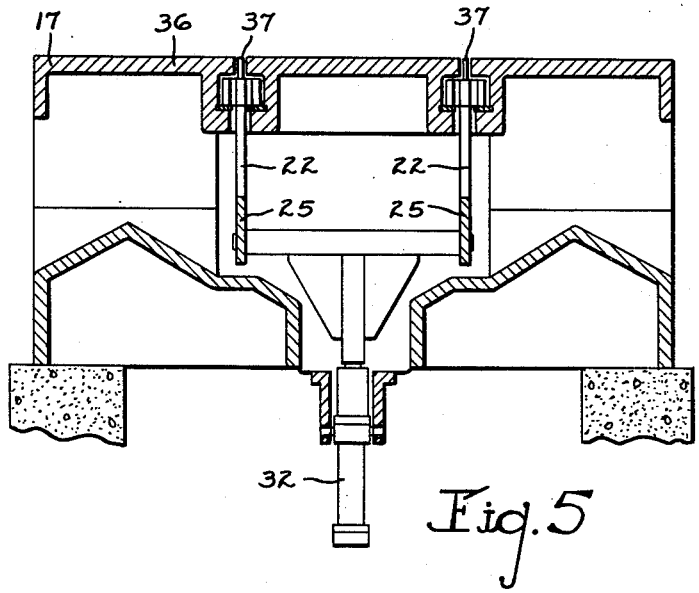
Figure 6:
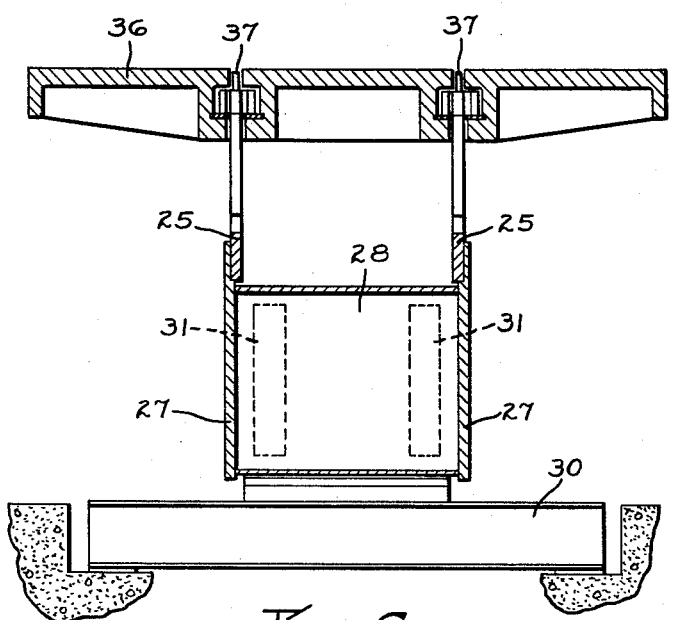
Figure 7:
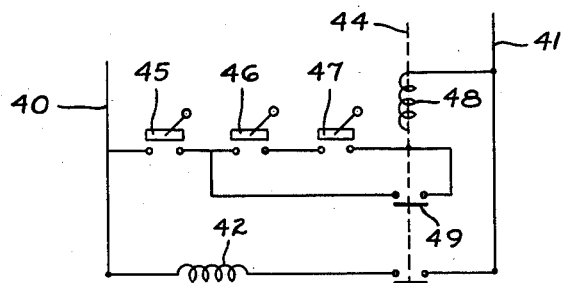
Figure 8:
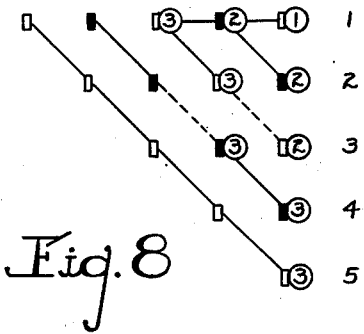
Figure 9:
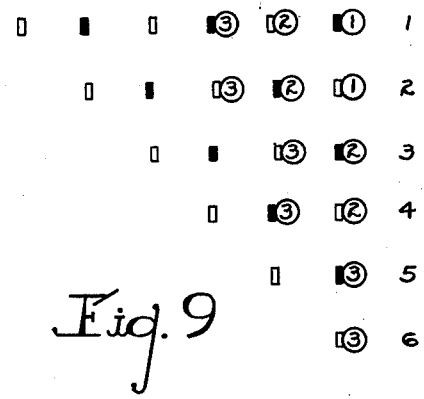

In the annexed drawings:

Figure 1 is a plan view of a portion of a steel mill embodying the principles of the present invention, Figure 2 is an enlarged view of a portion of the apparatus shown in Figure 1, Figure 3 is an elevational view of a portion of the apparatus shown in Figure 2, taken on the line III—III of Figure 2, Figure 4 is an enlarged view of a portion of the apparatus shown in Figure 3, Figure 5 is a sectional view of a portion of the apparatus taken on the line V—V of Figure 3, Figure 6 is a sectional view of the invention taken on the line VI—VI of Figure 3, Figure 7 is a schematic view of an electrical circuit used in the apparatus, and Figures 8 and 9 are schematic views showing the time and operative relationships in the apparatus during operation.

Referring first to Figures 1 and 2, wherein are best shown the general features of the invention, the conveying apparatus, designated generally by the reference numeral 10, is shown in use with other apparatus in a steel mill. The specific embodiment of the invention relates to the handling of the coils of rod which are the product of a rod rolling mill. The coils of rod are formed either in pouring reels 11 and 12, in laying reels 13 and 14, or in coarse pouring reels 15. The pouring reels 11, the laying reels 13, and the coarse pouring reels 15 are arranged to discharge onto an elongated, horizontal, endless-chain reel conveyor 16. The pouring reels 12 and the laying reels 14 are arranged to discharge their coils into a similar reel conveyor 17. The reel conveyors 16 and 17 are in slight angle to one another, converge toward the discharge end and are driven by a common drive at the same speed as will be described further hereinafter. Th discharge ends of the conveyors 16 and 17 intersect, respectively, elongated horizontal chain type main conveyors 18 and 19. Conveyors 18 and 19 are parallel to one another and reside at a substantial angle to the conveyors 16 and 17. Conveyors 18 and 19 discharge onto a transfer conveyor 20, which transfers the coil to a hook carrier 21. The hook carrier 21 has depending hooks on which the coils are carried in a vertical position. The hook carrier carries these coils to an assembly point for storage, at the same time providing a delay time to provide adequate cooling between the formation of the coil and the time that it is stored.

Referring to Figure 3 which shows best the construction of the apparatus associated with the discharge end of the reel conveyor 17, it can be seen that the conveyor is of the link-chain variety and is provided with hinged dogs 22. These dogs would normally be in a pendant position below the surface of the conveyor were it not for the fact that they are maintained in an upwardly-directed position by a rail 23 underlying the chain. The rail 23 ends a considerable distance from the discharge end of the conveyor 17 and its function is taken over by a support bar apparatus 24. Apparatus 24 consists of dog support rails 25 carried for vertical sliding in guides 26. As is evident in Figure 2, the conveyor 17 is a double-chain conveyor, i. e. there are two sets of link-chains and dogs fitting in slots in the upper surface of the conveyor apparatus. There are two sets of rails 25 in line with the conveyor so that each link chain is provided with its rail. This situation is particularly evident in Figures 5 and 6. As is evident in Figures 3 and 6, the rails 25 have side plates 27 dependent therefrom, and the side plates 27 are joined by a central boxlike girder construction 28, which in turn is guided in a support 29. The support 29 consists of a flat base 30 having upstanding abutments 31 between which the structure 28 is guided and supported. The forward and rearward ends of the rails 25 are provided with hydraulic cylinders 32 suitably mounted to permit the rails 25 to be moved up and down while maintaining a parallel relationship to the conveyor 17. Suitable controls for the cylinders 32 are provided but are not shown and do not constitute a part of the present invention. It is evident in Figures 2 and 3 that a short conveyor 33 is situated between the two chains of the conveyor 17 at the discharge end. Conveyor 33 consists of a chain having a dog 34 extending therefrom, the chain being guided on a sprocket wheel 35. The main link chains and dogs of the conveyor 17 terminate some distance from the conveyor 19, whereas the short chain 33 extends from a point somewhat short of the termination of the main chains of the conveyor 17 and ends adjacent the conveyor 19. Figure 4 shows on a somewhat enlarged scale the construction of operation of and relationship between the dogs 22 and the rails 25; the position of the dog 22 which is shown in dotted lines is the position that it occupies when the rail 25 is in its upper position, also shown in dotted lines.

In Figure 5 is shown the manner in which the conveyor 17 consists of a frame having an upper surface 36 having slots 37 therein in which reside the main link chains of the conveyor. The dogs 22 are shown in their lower position, resting on the rails 25 as they would reside when the rails are in their lower position under the control of the cylinder 32. The manner in which the dog actuating apparatus 24 is guided and supported is best shown in Figure 6.

Referring again to Figure 1, it can be seen that an electric motor 38 operates through a speed reduction unit to operate the transfer conveyor 20, the conveyor 20, in turn, operates through a gearing arrangement to drive the conveyors 18 and 19. The conveyor 19 drives bevel gears which serve to actuate a shaft 39, and thus, drive the conveyor 17 through sprocket wheels as well as drive the short conveyor 33. The conveyor 16 is similarly driven from the main conveyor 18.

Referring next to Figure 7 which shows an electrical schematic diagram of some of the interlock controls of the apparatus, we find that main lines 40 and 41 are connected to a source of power, not shown. The coil 42 of a solenoid valve constitutes part of the electrical apparatus. The solenoid valve is the valve which when actuated by the energization of the coil 42 causes the cylinders 32 to be actuated in such a way as to lower the dog supporting rails 25. This coil is connected to one side to the line 40 and at the other side to one side of the normally open contactor 43 and a relay 44 the other side of which is connected to the line 41. Also included in the circuit is a limit switch 45 which, as is shown in Figure 1, is directly-connected to the shaft 31 driving the conveyors 16 and 17. Operation of this limit switch will be discussed more fully hereinafter. Also included in the circuit are coil space limit switches 46 and 47 which are situated, as is evident in Figures 1 and 2, at spaced points adjacent the discharge end of the conveyors 16 and 17. These switches 45, 46 and 47 are connected in series with one another in such a manner that one side of the switch 45 is connected to the line 40 while the other side is connected to one side of the switch 46; the other side of the switch 46 is connected to one side of the switch 47 while the other side of the switch 47 is connected to one side of the coil 48 of the relay 44. The other side of the coil 48 is connected to the line 41. Furthermore, the common point of the switches 45 and 46 is connected to one side of a normally open contactor 49 of the relay 44, the other side of which is connected to the common point of the coil 48 and the switch 47.

The operation of the apparatus can now be clearly understood in view of the above description. Rod originating in the rod rolling mill is coiled in the reels and is discharged onto the conveyors 16 and 17. Because of changes of speed in the mill and the arrival of billets at the mill in an irregular manner, the discharge of coils onto the conveyors from the reels cannot be timed with any degree of regularity. When the coil has been discharged onto a conveyor 16 or 17, the coil is pushed along by means of a dog 22; in the portion of the conveyor adjacent to the reels, each dog is in the raised position extending upwardly above the surface 36 of the conveyor. It is necessary, of course, that an empty space in the conveyor be situated opposite the reel before a coil can be pushed from the reel onto the conveyor. Then the conveyor carries the coils of rod down to the discharge end and they are discharged onto the main conveyors, 18 and 19. The conveyors 18 and 19 carry the coils to the transfer conveyor 20 where they are turned from a horizontal position to a vertical position hanging from the hooks of the hook carrier 21. If it were possible to assure that every hook in the hook carrier 21 carried a coil of rod, it can be seen that the hook carrier could be driven at its slowest speed and, therefore, the greatest length of time would pass before the coil is loaded on the hook carrier and is removed at the discharge end. During this period, the coil is given an opportunity to cool. The operating personnel of the plant have an opportunity to test the wire for metallurgical properties and the like. The transfer conveyor 20 is provided with sets of dogs in a manner similar to the other conveyors. The hook carrier 21 and the transfer conveyor 20 are moved at approximately the same speed and there is a hook dependent from the carrier 21 to match each set of dogs on the conveyor 20. In order to assure that every hook of the hook carrier 21 is provided with a coil of rod, it is necessary, then, that every set of dogs on the conveyor 20 be provided with a coil of rod by the main conveyors 18 and 19. This can be accomplished by operating the conveyors 18 and 19 at one-half the speed of the conveyor 20 and by moving coils alternately from the conveyors 18 and 19 onto the conveyor 20. To do this it is necessary that the conveyors 18 and 19 be provided with coils of rod from the conveyors 16 and 17 in an even, regular manner. In the present case, conveyor 16 provides each set of dogs of the conveyor 18 with a coil and each set of dogs on the conveyor 19 is provided with a coil by the conveyor 17. Since the arrival of coils onto the conveyors 16 and 17 is irregular and yet the discharge of coils onto the conveyors 18 and 19 must be regular, there must be provision for delay at the discharge end of the conveyors 16 and 17. Opportunity for this delay is provided by the use of the short chain conveyor 33 and the dog actuating apparatus 24. With the manipulation of the dog-supporting rails 25, it is possible to deposit a coil at any of three delay stations, A, B, or C, which are indicated in Figures 1, 2 and 3. If the dogs are kept in raised position by the rail 25, the coil will be pushed by its pair of dogs 22 to the delay station, C, where the dog 22 sinks beneath the surface of the conveyor 17 as it goes around its sprocket wheel. The coil remains at the delay station C until the dog 34 of the short conveyor 33 comes around its sprocket 35, contacts the coil, and pushes it onto the conveyor 19. There is only one dog 34 on the conveyor 33 and this one dog is synchronized with the dogs of the conveyor 19 so that one coil is pushed from the conveyor 17 onto the conveyor 19 for every set of dogs on the conveyor 19. The dog 34, of course, is synchronized with the dogs on the conveyor 19 so that the coil arrives on the conveyor 19 when their pair of dogs is in the proper relationship to the conveyor 17. It can be seen, then, that with the irregular loading of the conveyor 17 from the coiling reels, it would be possible for the dogs 22 to push a second coil into contact with the coil which is already in the delay station C and is awaiting its opportunity to be pushed onto the conveyor 19. Such a situation would be intolerable, of course. Therefore, provision is made so that, when a coil arrives at the delay station B, it remains there if a coil is already situated in the delay station C. In the same way, a coil arriving at the delay station A will remain there if a coil is already situated in the delay station B. This mode of operation is assured by the use of the electrical circuits shown in Figure 7. As is evident from the drawing, the coil 48 of the relay 44 will be energized, thus closing the contactor 43 and energizing the coil 42 of the hydraulic valve solenoid for actuating the cylinders 32, only when a particular situation exists. This situation is present when all of the switches 45, 46 and 47 are closed. When this happens, current passes through the coil 48 and actuates the relay 44. However, it is to be noted that at the same time a holding circuit is set up through the contactor 49 so that, if either of the switches 46 and 47 are subsequently opened, the relay will remain actuated and the rails 25 will be in their lowermost position. In other words, the dogs 22 will be below the surface of the conveyor 17. Now, of course, the only time when the switches 45, 46 and 47 are all actuated, is when, first, the limit switch 45, which might be called the "odd-even" limit switch, is closed. This switch is attached to the shaft 39 in timed relation to the dog 34. The dog 34 comes around to pick up a coil from the delay station C upon alternate arrivals of the dogs 22 of the main chain of the conveyor 17. That is to say, the dog 34 arrives at the delay station C one time for every two arrivals of sets of dogs 22. So, we see that the limit switch 45 is closed at all times except when the dog 34 is just about to come into position to pick up a coil from the relay station C and that this takes place only upon the arrival of alternate dogs 22 at that station. As far as the switch 46 is concerned, this switch is located at the delay station B and is closed when a coil is located at that station. In a similar manner, the limit switch 47 is located at the delay station C and is closed when a coil lies on the conveyor at that point. It can be seen, then, that the switches 45, 46 and 47 are closed only when a coil is located at the delay station A, a coil is located at delay station B, and a dog 34 is not coming into position to carry a coil from delay station C onto the conveyor 19. In this situation, of course, it is definitely desirable not to have the coil which is located at the delay station B to move up into toward the delay station C; otherwise, the coils will ram together and confusion will result. If, however, there is no coil at the delay station B, it would be desirable that a coil which is located at delay station A be moved up to delay station B to keep these three delay stations as full as possible. In any case, when all three switches are closed, the coils 42 of the hydraulic valve solenoid is actuated and the valve caused the cylinders 32 to withdraw the rails 25 to a lower position, whereupon the dogs 22 at the positions of the relay station A and delay station B will fall beneath the surface of the conveyor and will not move the coils from those stations despite the fact that the conveyor link chain continues to move forward as before.

Figures 8 and 9 illustrate graphically the operation of the delay station with three adjacent coils on the reel conveyor. The white blocks indicate odd dogs, while the solid blocks indicate even dogs. A first horizontal line of each figure shows the three coils at the three delay stations. The second lines show the position of the coils after the relay conveyor is advanced the distance between two sets of dogs. The third lines show the position of the coils after the relay conveyor is advanced the space between three dogs, and the fourth lines show conditions after the passage of the space between four dogs, etc. The diagonal lines indicate operation of the dog support apparatus at the delay station A and B. If the line is solid, the support bars remain up; likewise, if they are dotted, support bars are lowered during that travel of the reel conveyor the distance between two successive dogs. In Figure 8, the leading coil #1 arrived at the delay station C in front of an odd dog, 22. Thus, during the next increment of travel of the reel conveyor for the distance between two dogs, the coil #1 is transferred to the main conveyor by the short conveyor chain, 33, while coils #2 and #3 advance to delay stations C and B, respectively, because the support bars remained up. At this point, coil #2 arrived at delay station C in front of an even dog and, therefore, must wait. Due to this situation the support bars must lower during the next increment of travel of the conveyor chains to hold the coil #3 at the delay station B so as to keep it from being pushed into coil #2. Toward the end of this increment of travel, the support bar is raised. On the next increment of travel of the reel conveyor, coil #2 is transferred to the main conveyor and simultaneously coil #3 is advanced to delay station C. At this point, coil #3 must wait for still another increment of travel of the reel conveyor before it will be transferred to the main conveyor by the short conveyor chain 33. Figure 9 shows the leading coil #1 arriving at delay station C in front of an even dog. Thus, during the next increment of travel of the reel conveyor chain, the support bars must be lowered, thereby leaving coils #2 and #3 at delay stations B and A respectively. From there on, the delay apparatus operates as described above.

Other modes of applying the principles of the invention may be employed, change being made as regards the details described, provided the features stated in the following claims or the equivalent of such be employed.

The invention having been thus described, what is claimed as new and desired to secure by Letters Patent is:

1. Conveying apparatus for the movement of articles comprising a first continuously running conveyor of the chain type having upstanding dogs to contact the articles, a second continuously running conveyor also of the chain type having upstanding dogs to contact the articles, the dogs in both cases being located at regular intervals along the conveyor, the discharge end of the first conveyor lying adjacent the oncoming chain of the second conveyor, the line of movement of the conveyors lying at a substantial angle, a first, second and third delay station for the articles located adjacent the discharge end of the first conveyor, means for moving an article directly from the third station to the second conveyor, and means for permitting articles to remain at the first and second delay stations despite the continuously running operation of the first conveyor.

2. Conveying apparatus for the movement of articles comprising a first continuously running conveyor of the chain type having upstanding dogs to contact the articles, a second continuously running conveyor also of the chain type having upstanding dogs to contact the articles, the dogs in both cases being located at regular intervals along the conveyor, the discharge end of the first conveyor lying adjacent the oncoming chain of the second conveyor, the line of movement of the conveyors lying at a substantial angle, a first, second and third delay station for the articles located adjacent the discharge end of the first conveyor, means for moving an article directly from the third station to the second conveyor, and means located adjacent the discharge end of the first conveyor for rendering the dogs that enter that portion of the conveyor underlying the first and second stations ineffective to move articles along the conveyor.

3. Conveying apparatus for the movement of coils of rod comprising a first continuously-running conveyor of the chain type having upstanding dogs to contact the coils, a second continuously-running conveyor also of the chain type having upstanding dogs to contact the coils, the dogs in both cases being located at regular intervals along the conveyor, the discharge end of the first conveyor lying adjacent the oncoming chain of the second conveyor, the line of movement of the conveyors lying at a substantial angle, a first, second and third delay station for the coils located adjacent the discharge end of the first conveyor, means for moving a coil directly from the third station to the second conveyor, a rail underlying a substantial portion of the path of the first conveyor to maintain the dogs in raised position, and a vertically movable rail located under the discharge end of the first conveyor that may be lowered to render the dogs that enter that portion of the conveyor underlying the first and second stations ineffective to move coils along the conveyor.

4. Conveying apparatus for the movement of coils of rod comprising a first continuously-running conveyor of the chain type having upstanding dogs to contact the coils, a second continuously-running conveyor also of the chain type having upstanding dogs to contact the coils, the dogs in both cases being located at regular intervals along the conveyor, the discharge end of the first conveyor lying adjacent the oncoming chain of the second conveyor, the line of movement of the conveyors lying at a substantial angle, a first, second and third delay station for the coils located adjacent the discharge end of the first conveyor, auxiliary means for moving a coil directly from the third station to the second conveyor, and control means located adjacent the discharge end of the first conveyor for rendering the dogs that enter that portion of the conveyor underlying the first and second stations ineffective to move coils along the conveyor, the first and second delay station each having a contact switch associated therewith to be actuated by a coil situated in the station, the said auxiliary means having a switch associated therewith which is actuated at a predetermined positioning of the auxiliary means, the control means being active to render the dogs ineffective only when all the switches are actuated.

5. Conveying apparatus for the movement of coils comprising a first continuously-running conveyor of the chain type having upstanding dogs to contact the coils, a second continuously-running conveyor also of the chain type having upstanding dogs to contact the coils, the dogs in both cases being located at regular intervals along the conveyor, the discharge end of the first conveyor lying adjacent the oncoming chain of the second conveyor, the line of movement of the conveyors lying at a substantial angle, a first, second and third delay station for the coils located adjacent the discharge end of the first conveyor, means for moving a coil directly from the third station to the second conveyor, and means located adjacent the said stations so that a coil will not be moved from one station to the next unless the said next station will be empty when the coil arrives there.

6. Conveying apparatus for the movement of articles comprising a first pair of aligned continuously-running conveyors of the chain type having upstanding dogs to contact the articles, a second continuously-running conveyor also of the chain type having upstanding dogs to contact the articles, the dogs in all cases being located at regular intervals along the conveyor, a discharge end of the first pair of conveyors lying adjacent the oncoming chain of the second conveyor, the line of movement of the first pair of conveyors lying at a substantial angle to the line of movement of the second conveyor, a series of delay stations for the articles at the discharge end of the first pair of conveyors, and means assuring that an article cannot be moved from a preceding station to a following station unless no article is located at the said following station.

7. Conveying apparatus for the movement of articles comprising a first pair of aligned continuously-running conveyors of the chain type having upstanding dogs to contact the articles, a second continuously-running conveyor also of the chain type having upstanding dogs to contact the articles, the dogs in all cases being located at regular intervals along the conveyor, the discharge end of the first pair of conveyors lying adjacent the oncoming chain of the second conveyor, the line of movement of the first pair of conveyors lying at a substantial angle to the line of movement of the second conveyor, and means located adjacent the discharge end of the first pair of conveyors for rendering the dogs that enter that portion of the conveyor ineffective to move articles along the conveyor.

8. Conveying apparatus for the movement of articles comprising a first pair of aligned continuously-running conveyors of the chain type having upstanding dogs to contact the articles, a second continuously-running conveyor also of the chain type having upstanding dogs to contact the articles, the dogs in all cases being located at regular intervals along the conveyor, the discharge end of the first pair of conveyors lying adjacent the oncoming chain of the second conveyor, the line of movement of the first pair of conveyors lying at a substantial angle to the line of movement of the second conveyor, a series of delay stations for the articles at the discharge end of the first pair of conveyors, and means assuring that an article cannot be moved from a preceding station to a following station unless there is no article located at the said following station, the said means being located adjacent the discharge end of the first pair of conveyors rendering the dogs that enter that portion of the conveyor ineffective to move articles along the conveyor.

References Cited in the file of this patent

UNITED STATES PATENTS

| | | |
|---|---|---|
| 1,355,488 | McKenney | Oct. 12, 1920 |
| 2,542,200 | Kraeger et al. | Feb. 20, 1951 |